United States Patent [19]

Dromigny

[11] Patent Number: 5,053,101
[45] Date of Patent: Oct. 1, 1991

[54] DEVICE TO PLACE FILMS IN A MOULDING MACHINE

[75] Inventor: Pierre Dromigny, Paris, France

[73] Assignee: Tölkki Oy, Nummela, Finland

[21] Appl. No.: 450,553

[22] Filed: Dec. 14, 1989

[51] Int. Cl.$^5$ .............................................. B65C 9/00
[52] U.S. Cl. ..................................... 156/571; 156/500; 156/566; 156/572; 425/123; 425/125; 425/126.1; 264/509
[58] Field of Search ............... 156/566, 571, 572, 476, 156/500; 264/509; 425/123, 125, 126.1

[56] References Cited

U.S. PATENT DOCUMENTS

| | | | |
|---|---|---|---|
| 3,454,991 | 7/1969 | Rees | 18/30 |
| 3,559,248 | 2/1971 | Stockmann | 264/509 X |
| 3,602,496 | 8/1971 | Langenohl et al. | 271/164 X |
| 3,619,858 | 11/1971 | Sutch | 15/8 R |
| 3,869,234 | 3/1975 | Sutch | 425/112 |
| 3,899,277 | 8/1975 | Winter | 425/383 |
| 3,941,539 | 3/1976 | Saumsiegle et al. | 425/242 B |
| 4,204,824 | 5/1980 | Paradis | 425/436 R |
| 4,233,006 | 11/1980 | Panas | 425/4 R |
| 4,281,707 | 8/1981 | Leleu | 164/292 |
| 4,355,967 | 10/1982 | Hellmer | 425/503 |
| 4,397,625 | 8/1983 | Hellmer et al. | 264/509 X |
| 4,462,952 | 7/1984 | Hautemont | 264/509 |
| 4,479,770 | 10/1984 | Slat et al. | 425/503 |
| 4,540,460 | 9/1985 | Blomquist et al. | 156/571 |
| 4,549,863 | 10/1985 | Bourgeois | 425/126 R |
| 4,563,148 | 1/1986 | Hasl et al. | 425/503 |
| 4,639,207 | 1/1987 | Slat et al. | 264/509 X |
| 4,680,000 | 7/1987 | Nowicki et al. | 425/126 R |
| 4,686,076 | 8/1987 | Dromigny et al. | 264/268 |
| 4,708,630 | 11/1987 | Hammond | 264/509 X |
| 4,710,116 | 12/1987 | Dromigny et al. | 425/116 |
| 4,737,098 | 4/1988 | Oles et al. | 264/509 X |
| 4,759,538 | 7/1988 | Dromigny | 271/31.1 |
| 4,784,592 | 11/1988 | Dromigny | 425/121 |
| 4,784,593 | 11/1988 | Dromigny | 156/397 X |

FOREIGN PATENT DOCUMENTS

| | | |
|---|---|---|
| 0238764 | 9/1987 | European Pat. Off. . |
| 1915388 | 10/1969 | Fed. Rep. of Germany . |
| 2009611 | 2/1970 | France . |
| 2606701 | 5/1988 | France . |
| 2606702 | 5/1988 | France . |

Primary Examiner—David A. Simmons
Assistant Examiner—J. Sells
Attorney, Agent, or Firm—Fisher, Christen & Sabol

[57] ABSTRACT

Device for placing films with a specific format in a machine for moulding an object, said films designed to at least partly coat the lateral surface and one extremity face of said object. This device includes:

a first magazine (7) containing a plurality of first films (8) each intended to coat one extremity face of said object, a second magazine (9) containing a plurality of second films (10) each intended to coat the lateral surface of said object, a member (14) having an external shape corresponding to that of the object to be coated and able to take from said first (7) and second (9) magazines first (8) and second (10) films, first (24,35) and second (21,36) means to apply and keep in place said first (8) and second (10) films against said member (14), and means (27,28) to convey said taking member (14) from the matrix (6) of said machine.

8 Claims, 9 Drawing Sheets

DEVICE TO PLACE FILMS IN A MOULDING MACHINE

FIELD OF THE INVENTION

The present invention concerns a device to place films with a specific format in a machine for moulding an object comprising two parts, at least one of said parts being mobile with respect to the other along a first direction.

BACKGROUND OF THE INVENTION

Such films are designed to be used to coat at least partly a moulded object by being "integrated" with the object at the time the latter is moulded. They may be used as a support for a decor with information concerning the contents of the object, brand indication, etc.

Up until now, no effective way has been found on how to resolve the problem of automatically and quickly coating in situ, that is in the mould, the lateral surface and one extremity face of an object, such as a generally tapered (or possibly cylindrical) pot.

SUMMARY OF THE INVENTION

With this aim in mind, the present invention concerns a device to place films with a specific format into a machine for moulding an object comprising two parts, at least one of said parts being mobile with respect to the other along a first direction, said films being intended to coat at least partly the lateral surface and one extremity of said object, this invention being notable in that it includes:

a first magazine containing a plurality of first films each intended to coat one extremity face of said object, a second magazine containing a plurality of second films each intended to coat the lateral surface of said object, a member having an external shape corresponding to that of the object to be coated and able to respectively take the first and second films from said first and second magazines, first and second means to apply and keep in place said first and second films against said member, and means to convey said taking member, along with the films applied to it, into the matrix of said machine provided in one of said parts.

Thus by means of the device of the invention, it is possible to simultaneously coat the lateral surface and one extremity face of the moulded object, the films used for this purpose being brought into the matrix of the moulding machine with the aid of a single member for taking said films from the first and second magazines.

According to a further characteristic of the invention, the taking member takes one first film from said first magazine by means of the the first depression means connected to displacement means and intended to bring said film from said magazine to said member against one extremity face of the latter, and second depression means are distributed over said extremity face.

Again, according to another characteristic of the invention, said taking member is connected to means intended to have it revolve around its longitudinal axis so that, during rotation of said member, the film, which is applied to its lateral surface, winds at least partly around the latter, and said member has third depression means distributed over the entire lateral surface of the latter.

Advantageously, a support roller is able to be applied to the lateral surface of said member so as to keep a second film placed against said lateral surface.

According to a further characteristic of the invention, the device includes means for moving said member parallel to said first direction.

Preferably, the means for conveying said taking member comprise a twin-crossed rack system, said racks being geared with each other, one of which is parallel to said first direction and integral with a first part of said machine, and the other, parallel to a second direction orthogonal to said first direction and being able to slide into a guide integral with the second part of the machine, is integral with said taking member.

Again, according to other characteristics of the invention, said first magazine is integral with the part of the moulding machine comprising said matrix, and/or said second magazine is able to be moved orthogonally to said first direction.

In addition, said taking member may have, at least approximately, a truncated shape.

BRIEF DESCRIPTION OF THE DRAWINGS

The figures of the accompanying drawing clearly illustrate how the invention may be embodied.

DETAILED DESCRIPTION OF THE PREFERRED EMBODIMENTS

Figure 1:
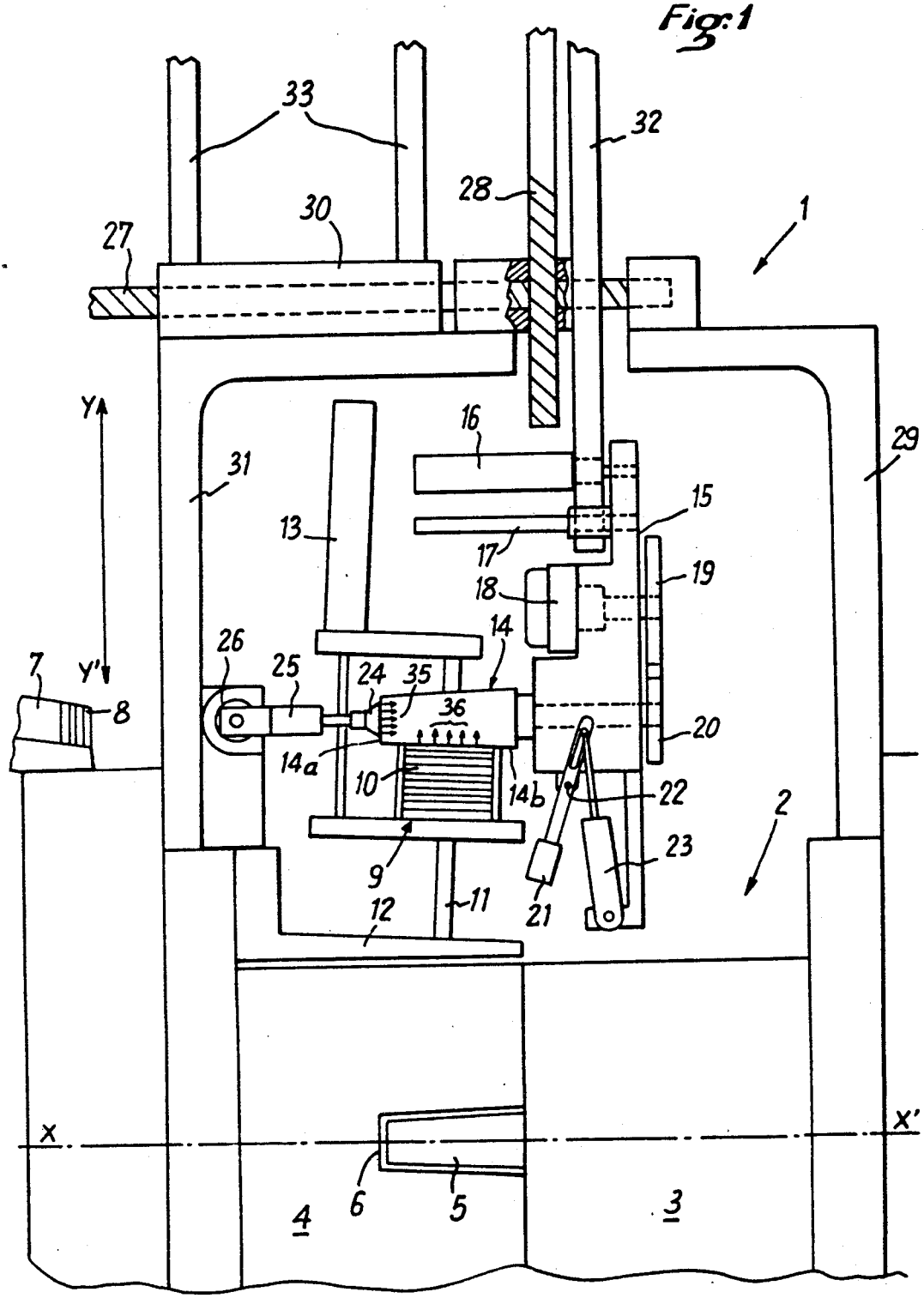
FIG. 1 diagrammatically illustrates an example for embodying the device of the invention applied to a moulding machine.

In the embodiment example represented, the device 1 of the invention is applied to a moulding machine 2 with an object comprising two mould male 3 and female 4 parts, at least one of which is mobile with respect to the other along a first direction X,X' and respectively having a punch 5 and a matrix 6.

The device 1 of the invention is designed to place films with a specific format required to at least partly coat the lateral surface and one extremity face of the moulded object in the matrix 6 of the female mould part 4. (At the time of moulding, the films shall be integrated with the object and could be used to support a decor with information concerning the object, a brand indication, etc).

To this effect, a first magazine 7 is provided containing a plurality of first films 8 each intended to coat one extremity face of the moulded object, the magazine 7 in this embodiment example being integral with the female mould part 4. A second magazine 9 contains a plurality of second films 10 each intended to coat the lateral surface of the moulded object. The magazine 9 is mounted mobile along a direction approximately perpendicular to the direction X,X' on guides 11, themselves mounted on a rectangular bracket 12 integral with the female mould part 4. Displacement of the magazine 9 along the guides 11 is ensured by a linear travel thrustor 13.

In addition, the device 1 includes a member 14 having an external shape corresponding to that of the object to be coated and able to respectively take from the first 7 and second 9 magazines first 8 and second 10 films. To this effect, suction means are provided on the extremity face 14a of the member 14 (arrows 35) and on the lateral surface 14b (arrows 36). The moulded object may, for example, have a truncated shape and constitute a pot intended to contain in particular a milky preparation. The taking member 14 may then, as reprsented, have a corresponding truncated shape.

The taking member 14 is mounted onto a movable support 15 with the aid of a linear travel thrustor 16 along the guides 17 parallel to the direction X,X'. In addition, the taking member 14 may be driven in rotation around its longitudinal axis parallel to the direction X,X' with the aid of a rotary thrustor 18 by means of gears 19 and 20 engaged with each other. In addition, the support 15 also carries a support roller 21 with a film against the member 14 and whose role shall be subsequently explained in more detail and which is able to pivot around a spindle 22 under the action of a linear travel thrustor 23.

The taking of a film 8 from the magazine 7 is in fact effected by means of a sucker 24 driven by a linear travel thrustor 25 and a rotary thrustor 26.

The device 1 further includes two crossed racks engaged with each other, one 27 parallel to the first direction X,X' being integral by means of a rectangular bracket 29 with the part of the male mould 3, the other 28 parallel to a second direction Y,Y' orthogonal to the direction X,X' being able to slide into a guide 30 integral with the other part 4 of the mould by means of a rectangular bracket 31. In addition, the rack 28 is integral with the support 15 of the taking member 14 by means of a mobile frame 32 parallel to the direction Y,Y' along guides 33.

Figure 2:
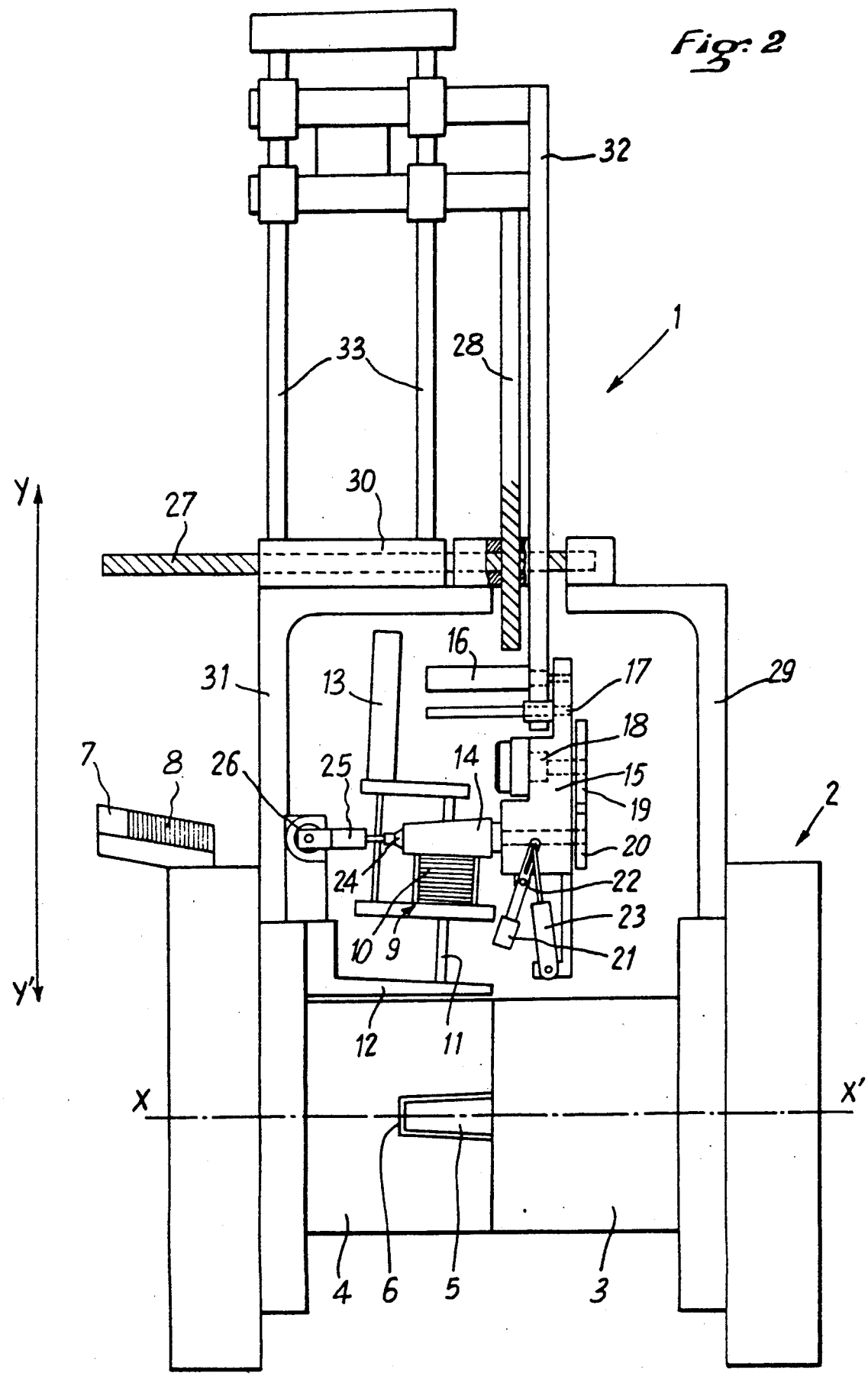
FIGS. 2 to 9 show the various stages for the functioning of the device of FIG. 1.

The functioning of the device described above is as follows:

In the stage shown on FIG. 2 (and also on FIG. 1), the second magazine 9 is moved under the effect of the linear travel thrustor 13 along the guides 11 until it comes to take support against the lateral surface of the taking member 14. Concomitantly, the sucker 24 bearing a first film 8 comes to take support against one extremity face 14a of the taking member 14. The suction means 35,36 (FIG. 1) of the taking member 14 make it possible to firstly apply the first film 8 borne by the sucker 24 against said extremity face 14a of the member 14 and secondly the upper film 10 of the magazine 9 against the lateral surface 14b of the member 14.

Figure 3:
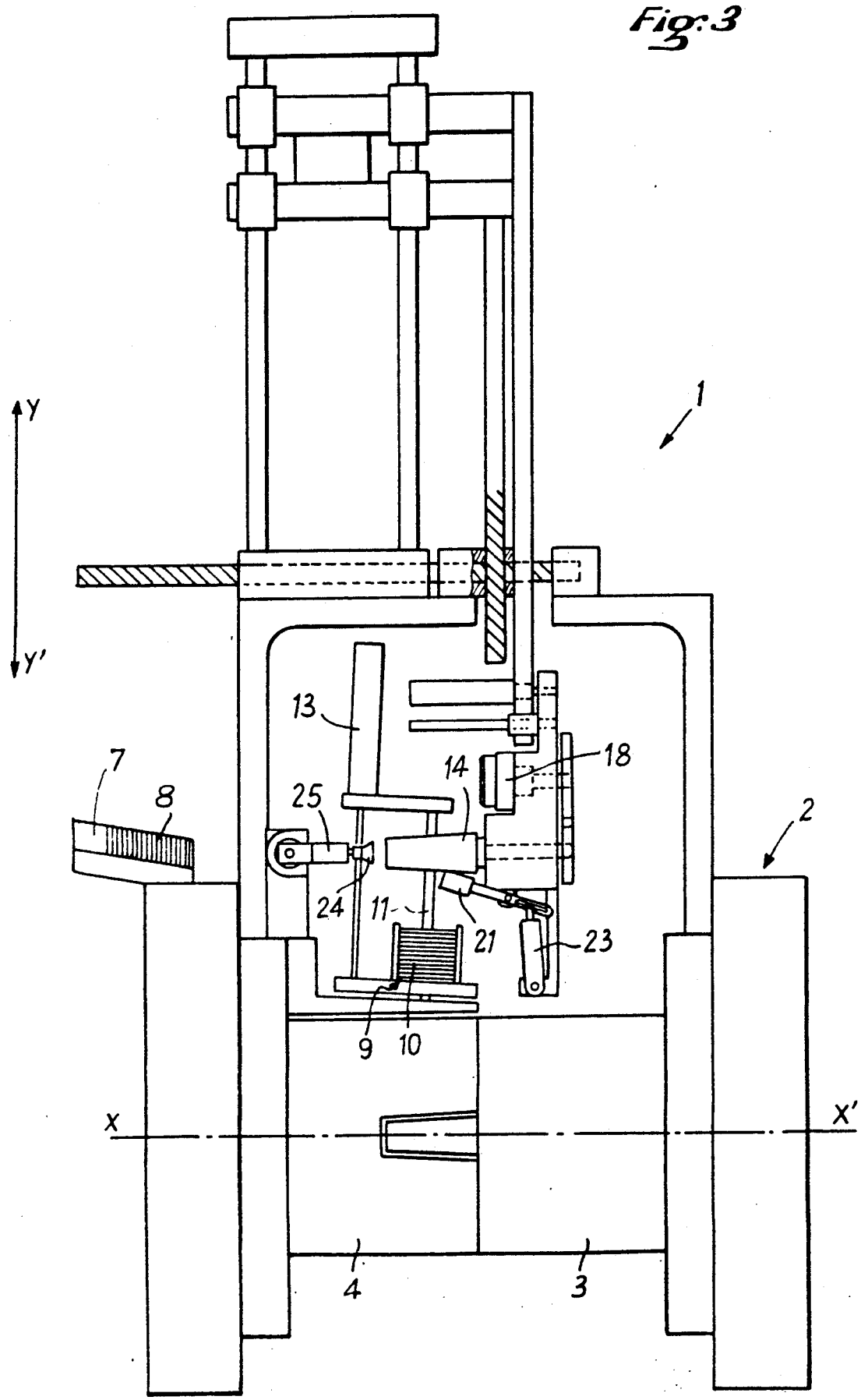

In the next stage shown on FIG. 3, the linear travel thrustor 25 causes the sucker 24 to be pushed back and the thrustor 13 makes the magazine 9 descend onto the guides 11, whereas at the same time the support roller 21 via the use of the thrustor 23 is applied against the taking member 14. The rotary thrustor then ensures winding of the film 10 onto the member 14. Quite obviously, during this stage, the suction means 35, 36 of the member 14 continue to apply the films 8 and 10 against said member.

Figure 4:
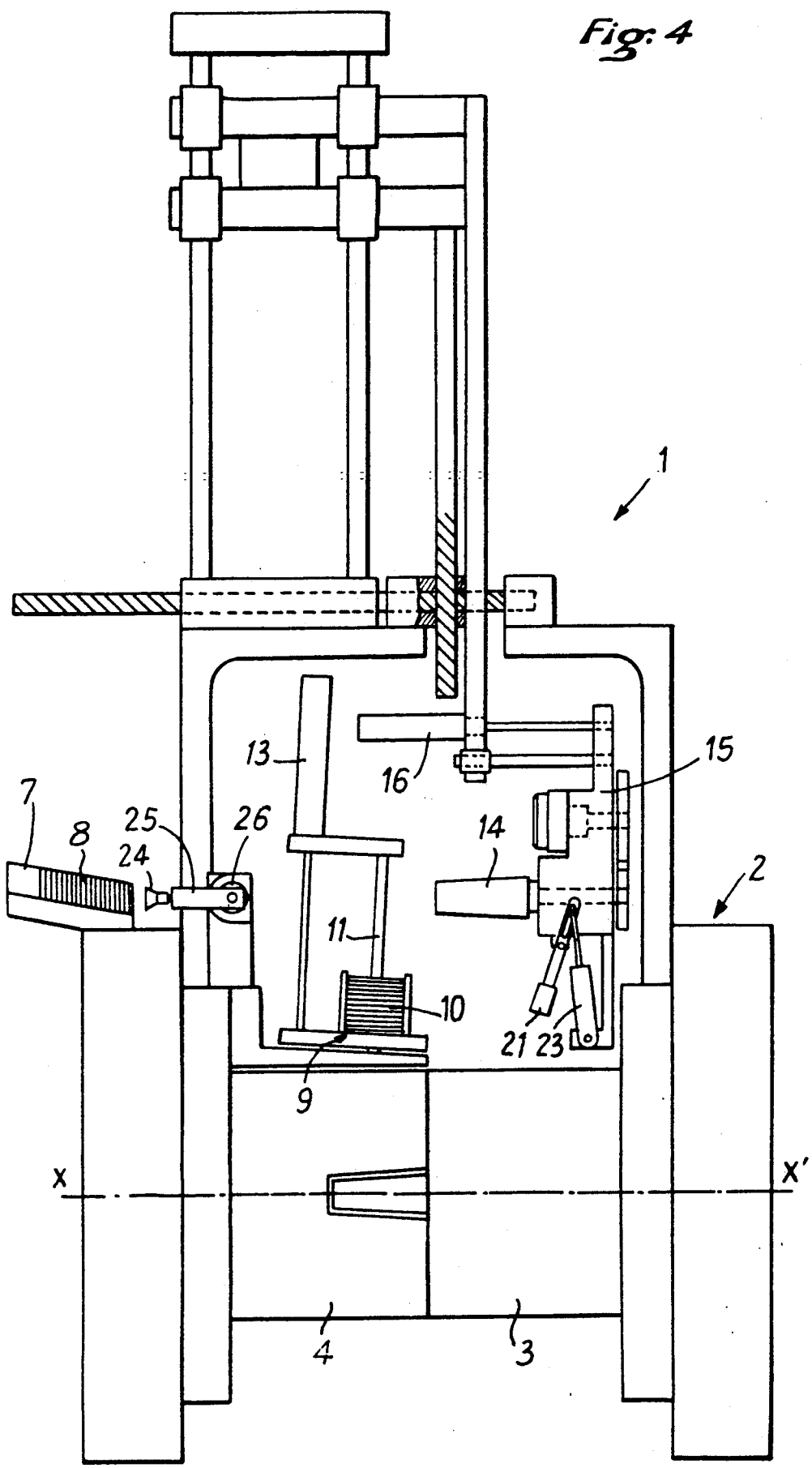

In the third stage shown on FIG. 4, the linear travel thrustor 16 moves the mobile support 15 of the member 14 towards the right as shown on the figure, whereas the action of the thrustor 23 moves the support roller 21 away from the member 14. The rotary thrustor 26 controls 180° rotation of the sucker 24. The two films 8 and 10 are of course still sucked in against the member 14.

Then, at the same time as the mould is opened, the support 15 and consequently the taking member 14 move down until said member 14 is opposite the matrix 6 of the mould by means of the crossed racks system 27, 28. Concomitantly, the thrustor 25 moves the sucker 24 towards the first magazine 7 where a film 8 is sucked in by said sucker (FIG. 5).

Figure 6:
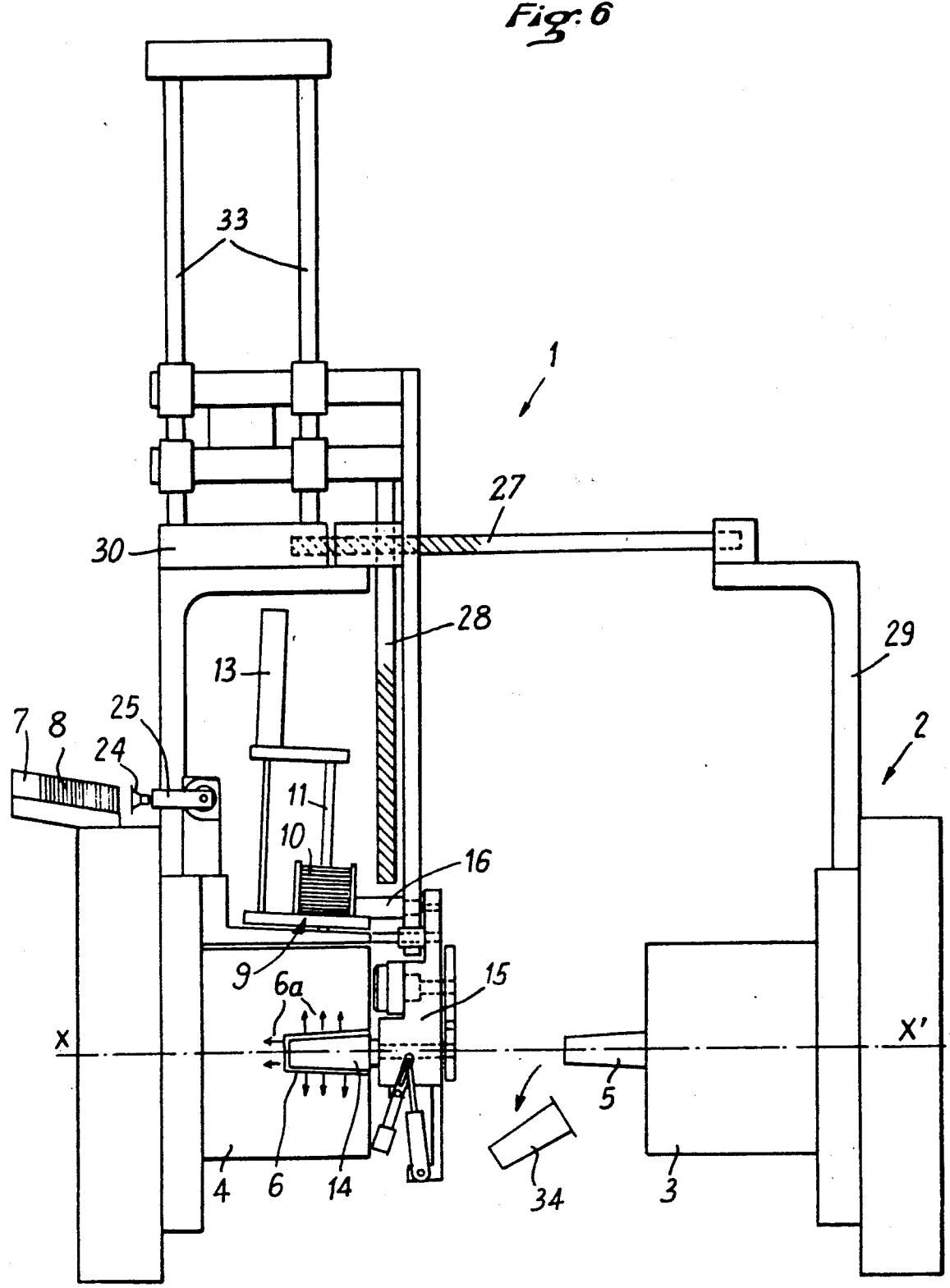

The thrustor 16 then causes the support 15 to move forward and consequently the taking member 14 into the matrix 6 of the mould at the same time the previously moulded object 34 coated with films is ejected from the mould. Once the taking member 14 is completely housed inside the matrix 6, suction of the two films against the member 14 is cut off, whereas these two films are sucked in by suction means (arrows 6a) against the lateral surface and the bottom of the matrix 6 (FIG. 6). In addition, in this same stage, the thrustor 25 moves the sucker 24, which has sucked in a film 8, away from the first magazine 7.

Figure 5:
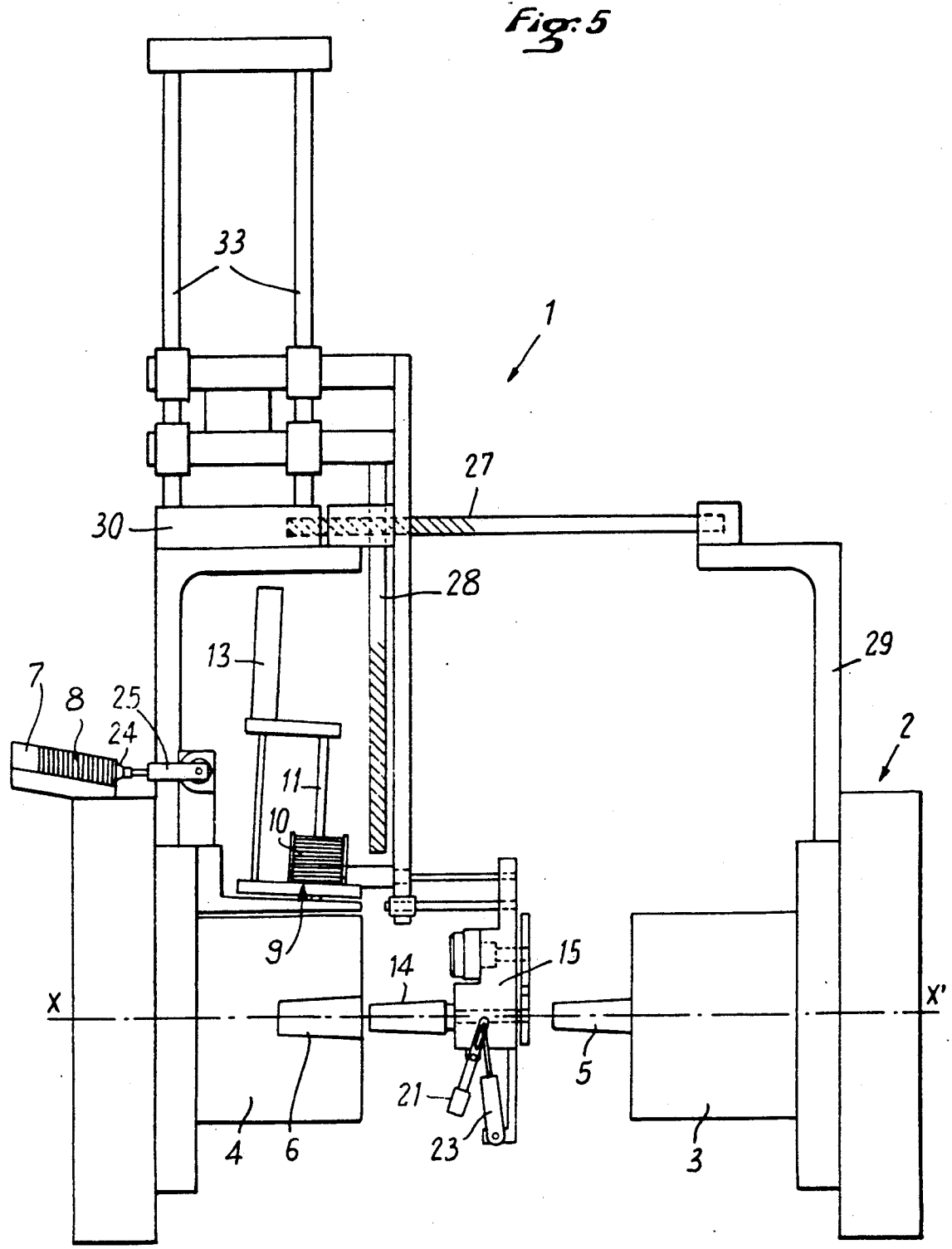
Figure 7:
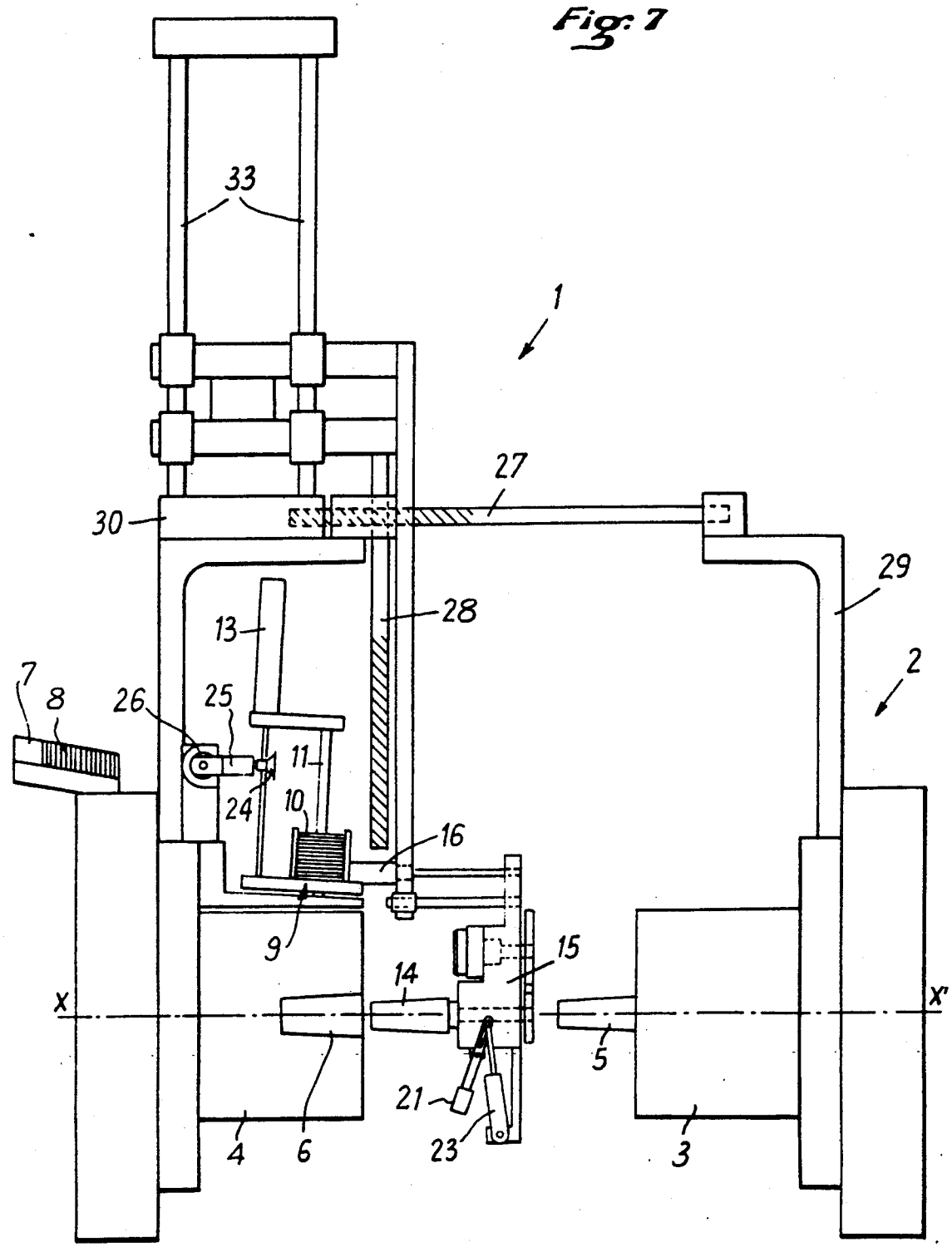

In the next stage (FIG. 7), the thrustor 16 brings the member 14 back into the position shown on FIG. 5 between the male 3 and female 4 parts of the mould. The rotary thrustor 26 causes the sucker 24 to rotate 180°, against which a film 8 is still sucked in.

Figure 8:
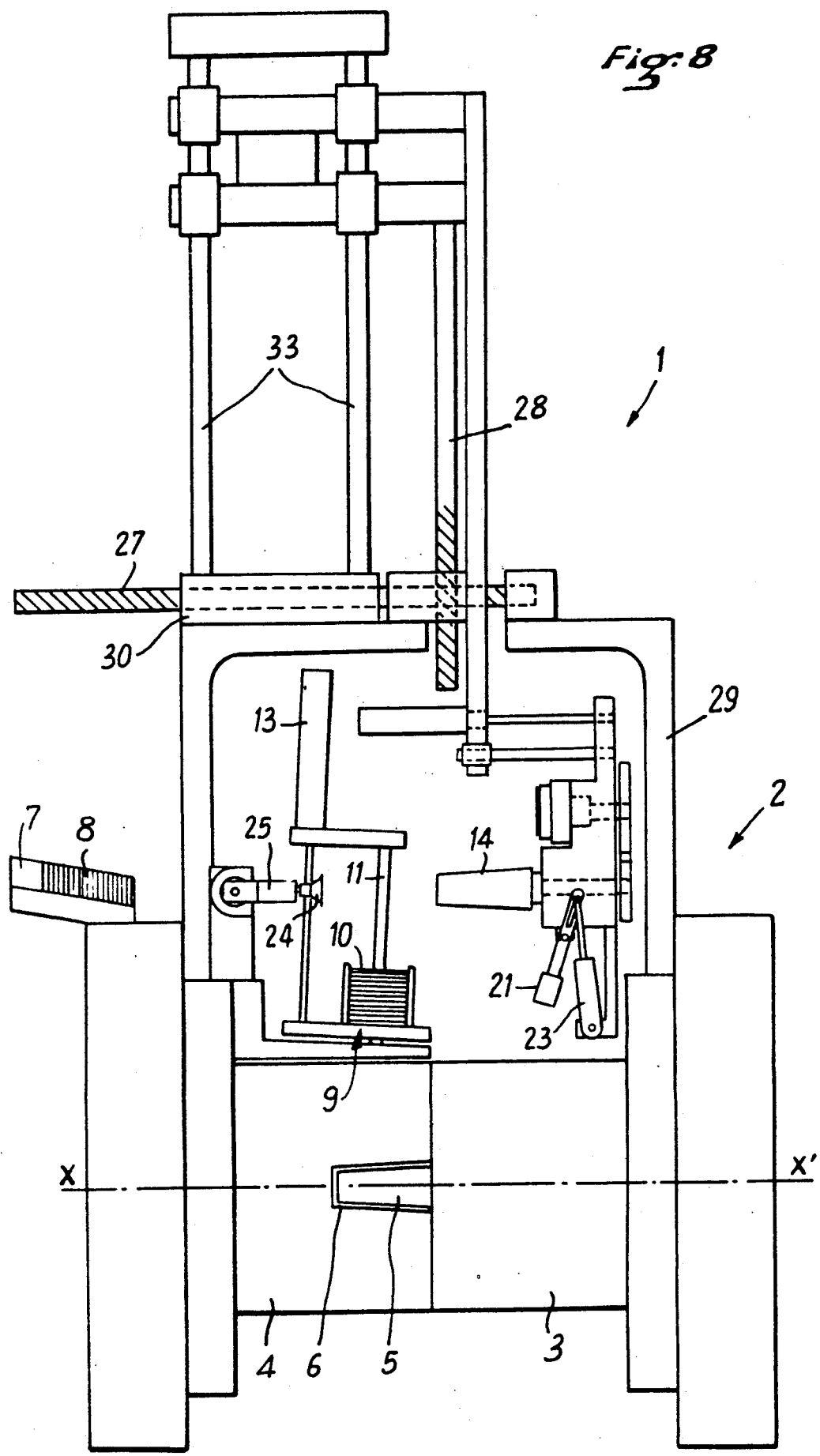

Then, the taking member 14 is brought back into the position shown on FIG. 4 when the mould is closed and still via the crossed racks 27 and 28 (FIG. 8).

Figure 9:
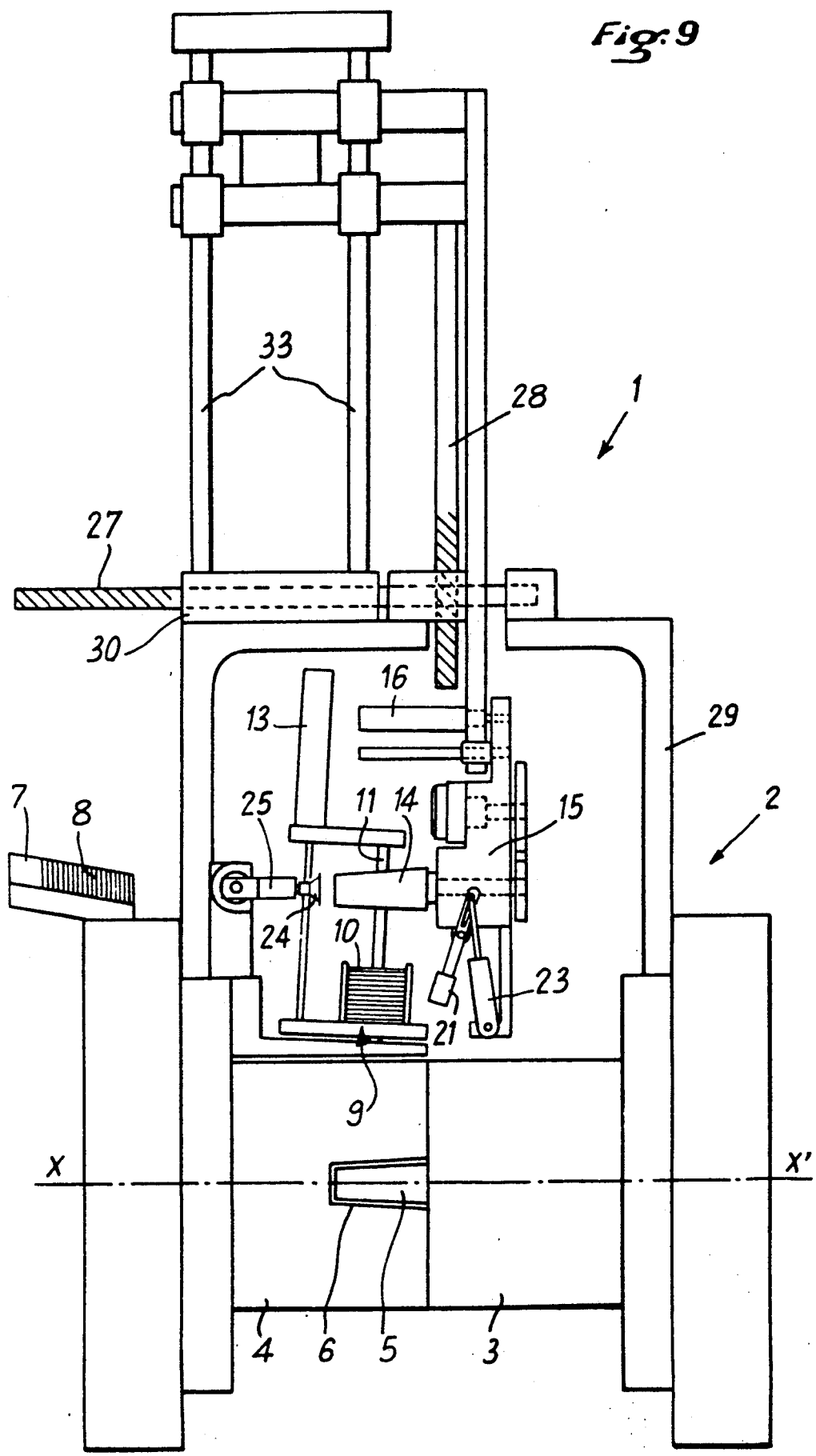

The thrustor 16 then causes the member 14 to move forward above the second magazine 9, whereas a new moulded object coated with two films is embodied in the mould (FIG. 9). The next stage corresponds to the stage of FIG. 2, the cycle having been completed.

What is claimed is:

1. Device to place films with specific formats in a machine for moulding an object comprising male and female mold parts, at least one of said parts being mobile with respect to the other along a first direction, said films being intended to at least partly coat the lateral surface and one extremity face of said object, wherein said device includes:
    (a) a first magazine containing a plurality of first films each designed to coat one face extremity of said object,
    (b) a second magazine containing a plurality of second films each designed to coat the lateral surface of said object,
    (c) one member having an external shape corresponding to that of the object to be coated and able to respectively take from said first and second magazines first and second films,
    (d) first and second means to apply and keep in place said first and second films against said member,
    (e) means connected to said taking member and intended to cause said taking member to rotate around its longitudinal axis so that, during rotation of said member, the film applied on the lateral surface of said member winds at least partly around said member, said member having first depression means distributed over the entire lateral surface of the latter.
    (f) a support roller intended to be applied on the lateral surface of said member so as to keep a second film in place against the latter and
    (g) means to convey said taking member, along with the films applied to it, into the female mold part of said machine.

2. Device according to claim 1, wherein the taking member takes a first film from said first magazine by means of second depression means connected to displacement means intended to bring said film from said magazine to said member against one extremity face of the latter, and wherein third depression means are distributed over said extremity face.

3. Device according to claim 1, wherein it includes means for moving said member parallel to said first direction.

4. Device according to claim 1, wherein the means for conveying said taking member comprise a system of two crossed racks geared with each other, one of which parallel to said first direction is integral with a first part of said machine, the other, which is parallel to a second direction orthogonal to said first direction and is able to slide into a guide integral with the second part of the machine, is integral with said taking member.

5. Device according to claim 1, wherein said first magazine is integral with the female mold part of said machine.

6. Device according to claim 1, wherein said second magazine is able to be moved orthogonal to said first direction.

7. Device according to claim 1, wherein said taking member has at least approximately a truncated shape.

8. A machine for moulding an object, said machine comprising male and female mold parts, at least one of said parts being mobile with respect to the other part along a first direction, said machine further comprising a device to place films with specific formats in the female mold part of said machine, said films being intended to at least partly coat the lateral surface and one extremity face of said object, said device including:

(a) a first magazine containing a plurality of first films, each designed to coat one face extremity of said object;

(b) a second magazine containing a plurality of second films, each designed to coat the lateral surface of said object;

(c) one member having an external shape corresponding to that of the object to be coated and able to respectively take from said first and second magazines first and second films;

(d) first and second means to apply and keep in place said first and second films against said member;

(e) means connected to said taking member and intended to cause said taking member to rotate around its longitudinal axis so that, during rotation of said member, the film applied on the lateral surface of said member winds at least partly around said member, said member having first depression means distributed over the entire lateral surface of the latter;

(f) a support roller intended to be applied on the lateral surface of said member so as to keep a second film in place against the latter; and (g) means to convey said taking member, along with the films applied to it, into the female mold part of said machine.

* * * * *